United States Patent
Paul et al.

(10) Patent No.: US 11,698,315 B1
(45) Date of Patent: Jul. 11, 2023

(54) RAREFIED PIEZOMETRIC UPTAKE APPARATUS AND METHOD FOR MEASURING GASEOUS UPTAKE

(71) Applicant: National Technology & Engineering Solutions of Sandia, LLC, Albuquerque, NM (US)

(72) Inventors: Matthew J. Paul, Albuquerque, NM (US); Joshua David Feldman, Richland, WA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/552,924

(22) Filed: Dec. 16, 2021

(51) Int. Cl.
*G01L 9/12* (2006.01)
(52) U.S. Cl.
CPC ..................... *G01L 9/12* (2013.01)
(58) Field of Classification Search
None
See application file for complete search history.

(56) References Cited

U.S. PATENT DOCUMENTS 11,143,615 B2 * 10/2021 Pierre ................ G01N 27/605
2018/0283284 A1 * 10/2018 Veilleux, Jr. ......... G01L 9/0089

OTHER PUBLICATIONS

M.W. Ackley, et al.; Application of natural zeolites in the purification and separation of gases. Microporous Mesoporous Mater. (2003) 61:25-42; https://doi.org/10.1016/S1387-1811(03)00353-6.
L.M. Anovitz and D.R. Cole; Characterization and analysis of porosity and pore structures. Rev. Mineral. Geochem. (2015) 80:61-164; https://doi.org/10.2138/rmg.2015.80.04.
R. Ash, et al.; Diffusion coefficients of paraffins in a graphon membrane: the early time procedure. J. Chem. Soc., Faraday Trans. (1976) 72:2777-2784; https://doi.org/10.1039/F19767202777.
L.H. Auer, et al.; The effects of barometric pumping on contaminant transport. J. Contam. Hydrol. (1996) 24:145-166; https://doi.org/10.1016/S0169-7722(96)00010-1.
S. Brandani; Analysis of the piezometric method for the study of diffusion in microporous solids: Isothermal case. Adsorption (1998) 4:17-24; https://doi.org/10.1023/A:1008831202564.
S. Brandani, et al.; Using a volumetric apparatus to identify and measure the mass transfer resistance in commercial adsorbents. Micropor. Mesopor. Mat. (2020) 304:109277, 9 pages; https://doi.org/10.1016/j.micromeso.2019.01.015.

(Continued)

*Primary Examiner* — Brandi N Hopkins
*Assistant Examiner* — Nigel H Plumb
(74) *Attorney, Agent, or Firm* — Daniel J. Jenkins

(57) ABSTRACT

A rarefied piezometric uptake apparatus and method for measuring gaseous uptake for large solid samples with little or no sample preparation. Past systems and methods require extensive sample preparation. The method includes providing a rarefied piezometric uptake apparatus having a dosing chamber and uptake chamber in an improved selective fluid communication. The apparatus and method improve the measurement of gaseous uptake into solid samples resulting in improved prediction of gas migration through solid samples such as geologic formations.

20 Claims, 4 Drawing Sheets

(56) References Cited

OTHER PUBLICATIONS

M. Bulow and A. Micke; Determination of transport coefficients in microporous solids. Adsorption (1995) 1:29-48; https://doi.org/10.1007/BF00704144.

M. Bulow, et al.; Intracrystalline diffusion of benzene in NaX zeolite studied by sorption kinetics. J. Chem. Soc., Faraday Trans. (1983) 79:2457-2466; https://doi.org/10.1039/F19837902457.

C.R. Carrigan, et al.; Trace gas emissions on geological faults as indicators of underground nuclear testing. Nature (1996) 382:528-531; https://doi.org/10.1038/382528a0.

G.R. Davidson; Use of SF6 to label drilling air in unsaturated fractured rock studies: Risk of over-purging. Appl. Geochem. (2002) 17:1361-1370; https://doi.org/10.1016/S0883-2927(02)00044-6.

J. Feldman, et al.; Effects of natural zeolites on field-scale geologic noble gas transport. J. Environ. Radioact. (2020) 220-221:106279, 10 pages; https://doi.org/10.1016/j.jenvrad.2020.106279.

A.M. Geddis, et al.; Rapid estimate of solid volume in large tuff cores using a gas pycnometer, NUREG/CR-6457 (1996) 83 pages.

E.R. Gilliland, et al.; Diffusion on surfaces. I. Effect of concentration on the diffusivity of physically adsorbed gases. Ind. Eng. Chem. Fundamen. (1974) 13(2):95-100; https://doi.org/10.1021/i160050a001.

S. Hwang and K. Kammermeyer; Surface diffusion in microporous media. Can. J. Chem. Eng. (1966) pp. 82-89; https://doi.org/10.1002/cjce.5450440206.

C. Johnson, et al.; Migration of noble gas tracers at the site of an underground nuclear explosion at the Nevada National Security Site. J. Environ. Radioact. (2019) 208-209:106047, 11 pages; https://doi.org/10.1016/j.ienvrad.2019.106047.

D.L. Johnson, et al.; Theory of dynamic permeability and tortuosity in fluid-saturated porous media. J Fluid Mech. (1987) 176:379-402; https://doi.org/10.1017/S0022112087000727.

W. Kast, et al.; Mass transfer within the gas-phase of porous media. Int. J. Heat Mass Transfer (2000) 43:807-823; https://doi.org/10.1016/S0017-9310(99)00158-1.

L.J. Klinkenberg; The permeability of porous media to liquids and gases. Drilling and Production Practice (1941) pp. 200-213.

G.D. Knowlton, et al.; Thermal study of types of water associated with clinoptilolite. Clays Clay Miner. (1981) 29(5):403-411; https://doi.org/10.1346/CCMN.1981.0290510.

S. Krishnamurthy, et al.; Adsorption and diffusion of CO2 in CPO-27-Ni beads. Adsorption (2020) 26:711-721; https://doi.org/10.1007/S10450-019-00162-x.

D. Linneman, et al.; Baseline characterization for change detection with joint inversion ERT and campaign seismic data. American Geophysical Union, Fall Meeting 2019 (2019) poster, 1 page.

H.W. March and W. Weaver; The diffusion problem for a solid in contact with a stirred liquid. Phys. Rev. (1928) 31:1072-1082; https://doi.org/10.1103/PhysRev.31.1072.

R.H. Nilson, et al.; Atmospheric pumping: A mechanism causing vertical transport of contaminated gases through fractured permeable media. J. Geophy. Res. Solid Earth (1991) 96(B13): 21,933-21,948; https://doi.org/10.1029/91JB01836.

K.B. Olsen, et al.; Noble gas migration experiment to support the detection of underground nuclear explosions. J. Radioanal. Nucl. Chem. (2016) 307:2603-2610; https://doi.org/10.1007/s10967-015-4639-7.

M.J. Paul, et al.; Xenon adsorption on geological media and implications for radionuclide signatures. J. Environ. Radioact. (2018) 187:65-72; https://doi.org/10.1016/j.jenvrad.2018.01.029.

M.J. Paul, et al.; An experimental method to measure gaseous diffusivity in tight and partially saturated porous media via continuously monitored mass spectrometry. Transp. Porous Media (2020) 133:1-22; https://doi.org/10.1007/s11242-020-01397-x.

Y. Shindo, et al.; Gas diffusion in microporous media in Knudsen's regime. J. Chem. Eng. Japan (1983) 16(2) 120-126; https://doi.org/10.1252/jcej.16.120.

Y. Sun and C.R. Carrigan; Thermally driven advection for radioxenon transport from an underground nuclear explosion. Geophys. Res. Lett. (2016) 43:4418-4425; https://doi.org/10.1002/2016GL068290.

S. Tamari; Optimum design of the constant-volume gas pycnometer for determining the volume of solid particles. Meas. Sci. Technol. (2004) 15:549-558; https://doi.org/10.1088/0957-0233/15/3/007.

A.H. Wilson; V. A diffusion problem in which the amount of diffusing substance is finite. Philos. Mag. (1948) 39(288):48-58; https://doi.org/10.1080/14786444808561166.

K. Wu, et al.; Model for surface diffusion of adsorbed gas in nanopores of shale gas reservoirs. Ind. Eng. Chem. Res. (2015) 54:3225-3236; https://doi.org/10.1021/ie504030v.

\* cited by examiner

RAREFIED PIEZOMETRIC UPTAKE APPARATUS AND METHOD FOR MEASURING GASEOUS UPTAKE

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention is directed to a method and system for measuring gaseous uptake for solid samples, including geologic samples.

BACKGROUND OF THE INVENTION

Measurement of gaseous uptake into solid samples, such as geologic samples, is necessary for predicting gas migration through geologic features and/or gas reservoir capacities. However, known methods for measurement of gaseous uptake are difficult, expensive and require extensive and destructive sample preparation.

Detection of short-lived radionuclides is a discriminating technique used for monitoring nuclear activities. Due to their chemical inertness and gaseous nature, radionuclides of noble gases are of particular interest as they are the most likely to escape containment. It is desirable to predict gas migration through geologic features, such as geologic containment in order to identify the presence of particular gases, such as gases that are produced during nuclear activities.

Despite their favorable properties, the geological containment nevertheless represents a formidable barrier to detection of these gases at the surface above an underground nuclear explosion (UNE). Chemical tracers can reach the surface through barometric pumping despite prompt containment provided there is a fractured pathway. Likewise, noble gas radionuclide tracers suggest other gas tracer properties in geologic features, in addition to diffusivity, may alter the movement and ultimate breakthrough time and dilution of the gas from the geologic containment.

Despite their chemical inertness, noble gas tracers nevertheless can have substantial interactions with solid surfaces through adsorption. Xenon, with its larger atomic mass and polarizable orbitals, has shown measurable physical adsorption on a number of weakly adsorbing media.

While gas adsorption properties have been measured on gram quantities of pure phase minerals using a surface area analyzer, scaling this effect to heterogeneous media over hundreds of meters remains a challenge. To explore how adsorption occurs on a heterogeneous sample on a kilogram scale, a different method is required.

In some cases, a BET surface area analyzer has been utilized to perform piezometric uptake measurements. These systems are well suited for milligram quantities as precision pressure, mass, and volume measurements are possible. However, a typical BET surface area analyzer is optimized for small grains so that equilibrium is rapidly reached. This enables many points on an adsorption isotherm to be measured in an efficient timeframe, but as only small samples are utilized, the uptake rate is relatively rapid, limiting the collection of transient data.

In addition to limiting the amount of transient data that is collectible, small and/or crushed samples are limiting when considering highly heterogeneous materials. Within a geologic unit, the representative elementary volume is typically far larger than the capacity of a surface area analyzer. Thus, it is unlikely to acquire a representative sample with a milligram subsample without extensive sampling. In addition, because subsampling to such small volumes necessitates cutting, crushing, grinding, or otherwise altering the geometry of the sample, these operations may render previously isolated pores or vugs accessible and pose a significant risk to fractionating grains based on physical properties of the minerals. Grinding or milling may similarly increase the specific surface area of the sample.

What is needed are methods and systems for measuring gaseous uptake, such as measuring adsorption kinetics and equilibrium properties for solid samples, including geologic samples, that overcome the limitations of the prior art.

SUMMARY OF THE INVENTION

The present disclosure is directed to an apparatus and method for measuring the piezometric uptake of solid samples that permits the measurement of the sample with little sample preparation and large sample sizes.

According to an embodiment of the disclosure, a rarefied piezometric uptake apparatus is provided. The apparatus includes a dosing chamber in selective fluid communication with an uptake chamber. The uptake chamber has a geometry that permits insertion of a solid sample with spacing between the solid sample and at least one wall of the uptake chamber. A vacuum source is arranged and disposed to draw a vacuum on the dosing chamber and uptake chamber sufficient to induce rarefied flow in the sample pores. A pressure measurement device is arranged and disposed to measure a pressure in the dosing chamber.

According to an embodiment of the disclosure, a method is provided for measuring gaseous uptake for a solid sample. The method includes providing a rarefied piezometric uptake apparatus having a dosing chamber and uptake chamber in selective fluid communication. The solid sample is positioned in the uptake chamber and the dosing and uptake chamber are outgassed. The update chamber and dosing chamber are isolated and a predetermined amount of a working gas is introduced into the dosing chamber. The working gas is released from the dosing chamber into the uptake chamber and a pressure in the uptake apparatus is measured to determine an uptake property of the solid sample.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Advantages of embodiments of the present disclosure include determination of uptake properties in solid samples with little to no sample preparation and larger sample sizes than have been previously possible. Uptake measurements taken according to the present disclosure permit analysis of a large number of types of geologic samples, allowing greater accuracy in predicting gas movements within geologic features and identification of rock samples.

Figure 1:
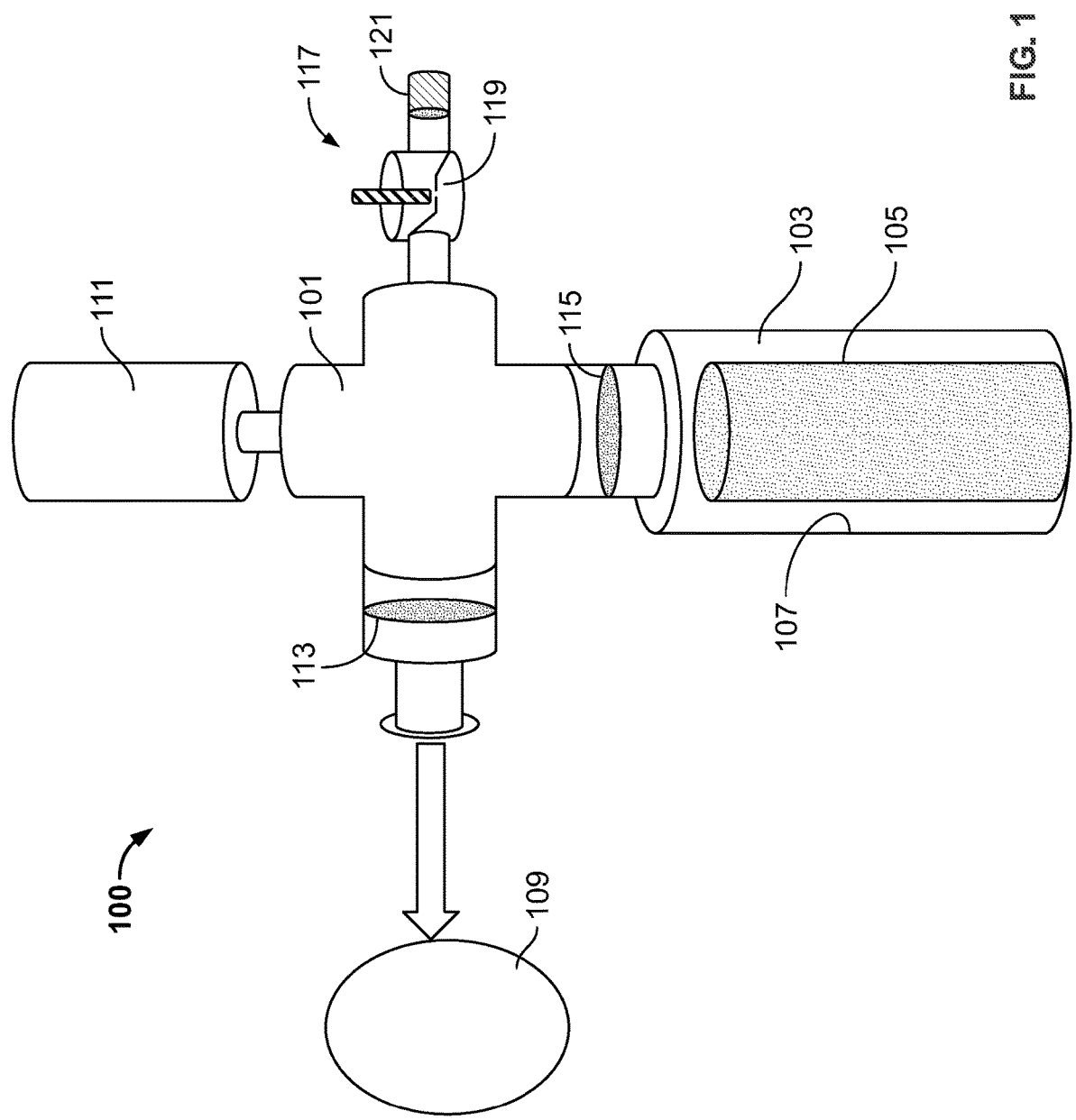
FIG. 1 illustrates an apparatus according to an embodiment of the present disclosure.

FIG. 1 shows a rarefied piezometric uptake apparatus 100 according to the present disclosure. As shown in FIG. 1, piezometric uptake apparatus 100 includes a dosing chamber 101 in fluid communication with an uptake chamber 103. The uptake chamber 103 has a geometry that permits insertion of a sample 105 with spacing between the sample 105 and at least one wall 107 of the uptake chamber 103. A vacuum source 109 is arranged and disposed to draw a vacuum on the dosing chamber 101 and uptake chamber 103. The vacuum drawn is a vacuum that is sufficient to induce rarefied flow in the sample pores. A pressure measurement device 111 is arranged and disposed to measure a pressure in the dosing chamber. Piezometric uptake apparatus 100 may be fabricated from any suitable material, including, but not limited to, steel, stainless steel, aluminum, copper, brass, glass, other high strength metals or alloys or combinations thereof.

The pressure measurement device 111 may include any pressure measurement device capable of measuring changes in pressure within the piezometric uptake apparatus 100. For example, pressure measurement device 111 may include, but is not limited to, a capacitance manometer, piezoelectric sensors or quartz resonance sensors. While not so limited, a single pressure gauge not requiring calibration for specific gases are particularly suitable. The pressure measurement device 111 includes a large dynamic range and fine resolution to monitor the total pressure of the measured chambers over multiple decades.

In one embodiment, the uptake chamber 103 includes a heating mechanism (not shown in FIG. 1), that provides heat to the uptake chamber 103 and sample 105. For example, uptake chamber 103 may be wrapped with heating tape or another heating element. In another embodiment, the uptake chamber 103 may be immersed in a heating bath, such as a heated bath of sand, water or oil.

The dosing chamber 101 includes a vacuum isolation valve 113 arranged to isolate the dosing chamber 101 and a sample isolation valve 115 arranged to isolate the uptake chamber 103. Vacuum isolation valve 113 and sample isolation valve 115 are any suitable valve arrangement capable of providing gas isolation between the dosing chamber 101 and each of the vacuum source 109 and the uptake chamber 103, respectively. Suitable valves include, but are not limited to butterfly valves, ball valves, balancing valves, gate valves, globe valves, needle valves, plug valves or any other valve configuration that can isolate gases. A particularly suitable valve for use as the vacuum isolation valve 113 and the sample isolation valve 115 is a butterfly valve. The vacuum isolation valve 113 and the sample isolation valve 115 is preferably a configuration that does not alter the volume of the dosing chamber 101 and the uptake chamber 103. In addition, the dosing chamber 101 includes a dosing feature 117 having a dosing isolation valve 119 and a dosing port 121 for injecting a gas into the dosing chamber 101. Dosing isolation valve 119 is any suitable valve arrangement capable of providing gas isolation between the dosing feature 117 and the dosing chamber 101. A suitable valve for use as the dosing isolation valve 119 includes, but are not limited to, a globe valve, a butterfly valve, a ball valve, a balancing valve, a gate valve, a needle valve, a plug valve or any other valve configuration that can isolate gases. A particularly suitable valve for use as the dosing isolation valve 119 is a globe valve. The dosing feature 117 may include a septum or other similar structure to permit injections of gas into the dosing chamber 101. For example, in one embodiment, the dosing feature 117 includes a septum that permits injection of gas via a syringe.

Figure 2:
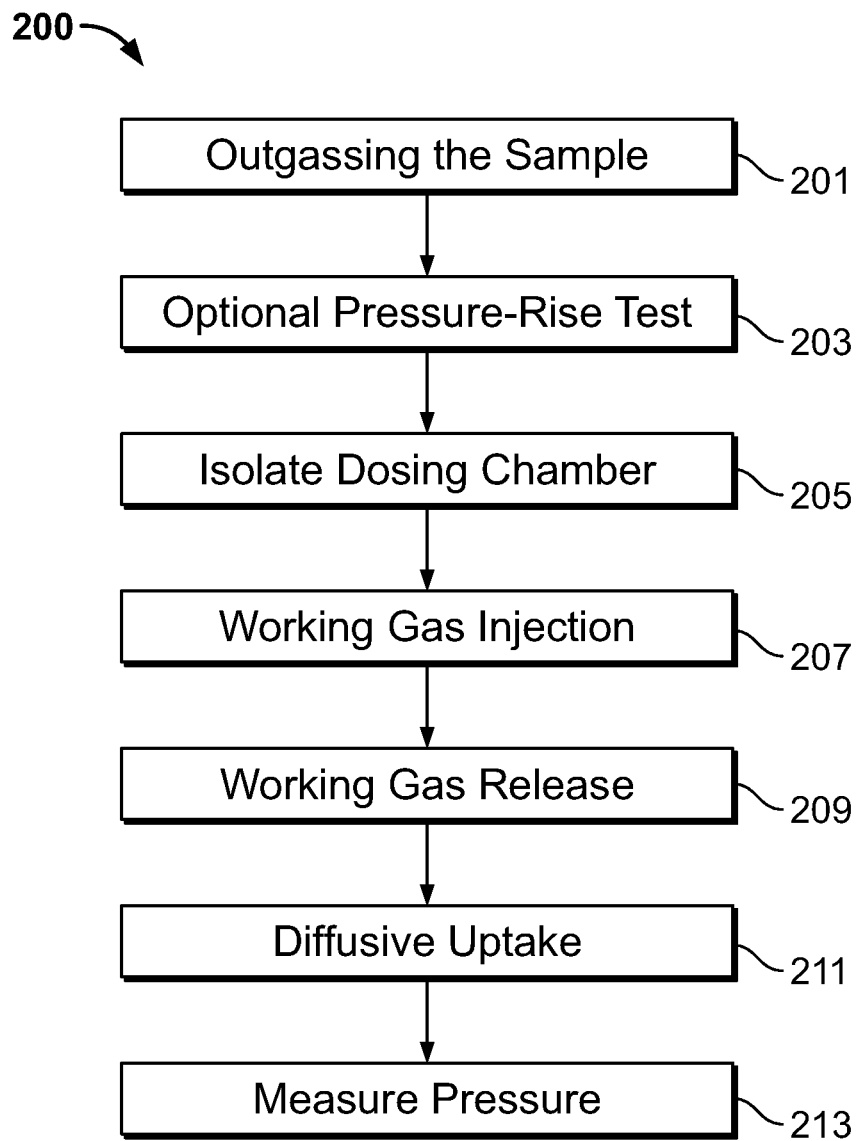
FIG. 2 shows a flowchart illustrating the process according to an embodiment of the present disclosure.

FIG. 2 illustrates a method 200 for measuring gaseous uptake for a solid sample utilizing the rarefied piezometric uptake apparatus 100 according to the present disclosure. Solid sample, as utilized herein, include samples that have at least a portion of the bulk being solid and may include porous materials or samples including solid material and entrained non-solid material. Method 200 includes outgassing the sample (step 201), an optional pressure-rise test (step 203), isolating the dosing changer (step 205), working gas injection (step 207), working gas release (step 209), diffusive uptake (step 211), and measuring pressure (step 213).

To start method 200, a solid sample of a measured quantity, such as, but not limited to a geologic core sample made up of a porous media, is inserted into the uptake chamber 103. In one embodiment, the sample 105 is a geologic core sample, as sampled with little or no additional sample preparation. The sample 105 may include a geometry that corresponds to the geometry of a sample drill or other sampling device for obtaining geologic samples. For example, the sample 105 may include a cylindrical geometry of from 6 inches to 18 inches long and from 2 to 3 inches in diameter or a geometry of about 12 inches long and about 2.5 inches in diameter. In addition, the sample 105 is not particularly limited and may include a mass of greater than 0.5 kg, up to 1 kg or greater than 1 kg. The uptake chamber 103 is of a known volume to house the sample 105 and to calculate the gaseous uptake. For example, uptake chamber 103 may include a geometry to provide a substantially uniform gap around the sample. In one embodiment, the gap is the space between wall 107 and the outer surface of sample 105 (see for example, FIG. 1). The substantially uniform gap preferably includes a gap of from ¼ inch (0.64 cm) to ½ inch (1.27 cm). If the gap is too small (e.g., below ¼ inch (0.64 cm)), under exemplary vacuum conditions, such as 1 to 130 Pa, flow will be choked and the pressure won't be uniform outside of the sample, preventing the ability to measure diffusivity. In some embodiments, a larger gap may be utilized, but then pressure change will be dominated by this empty space instead of by the sample pores and may result in less accurate data regarding the porosity of the sample 105. Because real pressure transducers have limited resolution, this decreases the accuracy of the diffusivity measurement. For example, the uptake chamber 103 may include a cylindrical geometry having from 6 inches to 18 inches long and from 2 to 3 inches in diameter or a geometry of about 12 inches long and about 2.5 inches in diameter, wherein the clearance between the sample 105 and wall 107 of uptake chamber 103 is from ¼ inch (0.64 cm) to ½ inch (1.27 cm) when operating at pressures of from 1 Pa to 130 Pa. The clearance between the sample 105 and wall 107 of uptake chamber 103 varies based upon the mean free path of the working gas at medium vacuum (e.g., between 0.1 to 400 Pa). If the gap is too small, under the medium vacuum conditions, flow will be choked and the pressure won't be uniform outside of the sample 105, preventing the diffusivity from being determined. It is possible to use a larger gap (e.g., greater than ½ inch (1.27 cm)), but then pressure change will be dominated by this empty space instead of by the sample pores.

Once the solid sample is positioned in the uptake chamber 103, the sample 105 is outgassed in the uptake chamber 103 (step 201). Outgassing includes drawing a vacuum via vacuum source 109 and optionally heating the uptake chamber 103. Outgassing is performed to remove gases and other compounds that had previously been adsorbed or were present in the pores of the sample 105. According to an embodiment of the present disclosure, the outgassing includes drawing a medium vacuum on the uptake chamber 103 and dosing chamber 101. Medium vacuum, as utilized herein, is a vacuum of from 0.1 Pa to 400 Pa or from 1 Pa to 130 Pa. For example, outgassing may remove adsorbed water vapor, carbon dioxide, or other gases previously adsorbed by the sample 105 due to the exposure to the atmosphere. The outgassing may also be performed utilizing vacuum alone. In one embodiment, the ultimate vacuum achievable by the vacuum pump utilized for outgassing may be equal to or less than 10 Pa. In one embodiment, the outgassing includes drawing a vacuum sufficient to induce rarefied flow in the sample 105 pores. In another embodiment, the sample 105 may optionally be heated in the uptake chamber 103. The application of heat may increase the rate of desorption and diffusion. The time required to outgas a geologic sample will vary with the strength of the gas-sample interaction, degree of water saturation, and extensive size of the sample. Similarly, the acceptable virtual leakage rate is dependent upon the sample 105. Any elevated temperature can be utilized that does not alter the solid sample material or damage the apparatus. After the heating step, the sample 105 is permitted to cool to room temperature or chilled to a lower temperature using methods including, but not limited to exposure to chilled water, ice baths, dry ice baths, or cryogenic fluids such as liquid $N_2$ or Ar. The extent of outgassing may be such that the residual virtual leakage rate after outgassing is not zero but only small compared with the diffusive uptake rate.

In one embodiment, the outgassing (step 201) includes a pressure-rise test (step 203) to ensure there were no gross virtual leaks from the sample 105 outgassing and that the vacuum isolation valve 113 was seated properly. The pressure-rise test includes closing the vacuum isolation valve 113 to isolate the vacuum pump from the dosing chamber 101. In addition, the vacuum source 109 is vented to atmospheric pressure to ensure any leakage across the vacuum isolation valve 113 can enter the dosing chamber 101. Pressure rise in the isolated system was then confirmed to be sufficiently low. In one embodiment, the pressure rise in the pressure-rise test is not to exceed 0.1% of the pressure transducer full scale over at least 120 seconds. The minimum detectable leakage rate by this method is dependent upon the chamber volume and sample dimensions and porosity. In one embodiment, the minimum detectable leak is approximately $1 \times 10^{-5}$ std $cm^3/s$.

After outgassing (step 201) and, optionally performing a pressure-rise test (step 203), the uptake chamber 103 is isolated from the dosing chamber 101 (step 205). Accordingly, sample isolation valve 115 is closed to prevent flow of gas into the uptake chamber 103.

Once the uptake chamber 103 is isolated from the dosing chamber 101, a working gas is injected into the dosing chamber 101 via the dosing feature 117 (step 207). The quantity of working gas is a predetermined amount of working gas that is injected into the dosing chamber 101 through a dosing port 121, which may be a septum, using a gas-tight syringe. Using a needle with a narrow throat, the dosing chamber 101 will fill slowly as flow is sonically choked in the needle. Injection is then manually terminated near the maximum range of the pressure gauge to maximize the effective range of the instrument. Additionally, dosing isolation valve 119 located between the dosing chamber 101 and the dosing port 121 is also shut after the dosing chamber 101 has been charged to prevent permeation of atmospheric gases into the chamber through the dosing port 121. The working gas is added to the dosing chamber 101 until a predetermined pressure in the dosing chamber 101 is reached. The pressure in the dosing chamber 101 of the working gas is sufficiently high to provide a pressure gradient upon release that permits measurements of pores, but not so low that it requires specialized equipment. A suitable pressure range for use in the dosing chamber is between 1 and 130 Pa. The maximum pressure utilized for working gas injected into the dosing chamber 101 corresponds to the mean free path of the working gas. For example, TABLE 1 shows the mean free path at 100 Pa and 1 Pa for a few exemplary working gases. The pores sizes of the sample 105 are approximately ¹⁄₁₀th the mean free path for the working gas. At least one trial using a reference gas as the working gas that is both non-reactive and non-adsorbing gas, such as helium, should be conducted to determine the porosity and diffusivity of the sample 105 without adsorption effects. When characterizing samples for applications with adsorption effects, additional trials may be conducted with alternate working gases to measure specific selectivity of uptake in the sample. For example, multiple runs of method 200 may be provided, each with a different gas species. The difference in the uptake characteristics of the individual working gases into the sample characterize the sample for gas storage and transport properties. For example, the method according to the present disclosure could be used to assess gas reservoirs for their ability to sequester $CO_2$.

After the working gas is injected (step 207), the initial pressure of the dosing chamber 101 is measured with the pressure measurement device 111 and the working gas is released (step 209). The working gas is released by opening the sample isolation valve 115. The opening of the sample isolation valve 115 is preferably performed quickly to promptly expand the working gas into the annular void region surrounding the sample 105 in the uptake chamber 103. While not wishing to be bound by theory, some of the expanded working gas will penetrate the sample 105 during the rapid expansion, but this quantity will be limited to Knudsen flow. Thereby, the remaining pressure after the prompt expansion is largely a function of the volume of the dosing chamber 101 to the unoccupied volume of the uptake chamber 103.

In one embodiment, to reduce the effects of the valve-action time, a quarter-turn butterfly valve for sample isolation valve 115 is provided due to quick actuation and large flow area. In addition, quarter-turn butterfly valves have a constant volume in the piezometric uptake apparatus 100. Sample isolation valves 115, such as vacuum gate or globe valves, having rising stem or bonnet, that change the volume of piezometric uptake apparatus 100 during actuation are less preferable or undesirable.

After the working gas release (step 209), the method 200 includes a diffusive uptake of the working gas into the solid sample (step 211). As the expansion process occurs rapidly, there is minimal time for heat transfer between the gas and the chamber or sample. For a rarefied gas as the working gas, and especially for a noble gas, the gas can be adequately represented using the ideal gas equation of state. The resulting temperature and pressure following the adiabatic expansion of an ideal gas can be determined from the ratio of the initial to final volumes. Here, let the initial volume being the dosing chamber 101 volume, $V_d$, and the final volume is the summation of the dosing chamber 101 volume and, assuming minor uptake into the core sample 105, the volume of the void in the uptake chamber, $V_u$. Where R is the ideal gas constant, the resulting pressure, P, and temperature, T, ratios vary with the specific heat capacity of the gas at constant volume $c_v$ and at constant pressure $c_p$ such that $$\left(\frac{P_2}{P_1}\right)^{\frac{c_v}{c_p}} = \left(\frac{T_2}{T_1}\right)^{\frac{c_v}{R}} = \frac{V_d}{V_d + V_u}.$$

At the completion of the diffusive uptake (step 211), the pressure in the piezometric uptake apparatus 100 (i.e., the pressure of the dosing chamber 101 and the uptake chamber 103) is measured with a pressure measurement device 111 (step 213). The pressure measurement is utilized to determine an uptake property of the solid sample. Uptake property, as utilized here, is any property corresponding to the ability for a solid sample to retain gaseous substances, for example, via adsorption or via pores in the composition.

In one embodiment, method 200 utilizes three noble gases as working gases. The noble gases utilized in this embodiment include helium (He), argon (Ar) and xenon (Xe). The sample isolation valve 115 between the dosing chamber 101 and uptake chamber 103 is opened and the rate at which the pressure diminishes in the piezometric uptake apparatus 100, particularly at the dosing chamber 101 is measured. As the noble gases are monatomic, they have a nearly constant specific heat capacity with temperature. The specific heat capacity at constant volume, $c_v$, and constant pressure, $c_p$, are effectively 3/2 R and 5/2 R, respectively, for all monatomic gases. In this embodiment, the combined volume of the void spaces is roughly twice that of the dosing chamber 101 alone. Consequently, for an ideal monatomic gas initially at 293 K ($T_1$) and 100 Pa ($P_1$) adiabatically expanded to twice its initial volume, the pressure ($P_2$) would fall to less than one-third of its initial pressure and temperature would fall to approximately 195 K ($T_2$). Thus, immediately following the working gas release (step 209), the system can be markedly non-isothermal.

After the prompt expansion and subsequent thermal recovery, diffusive uptake takes place (step 211) where the pressure in the dosing chamber 101 and uptake chamber 103 continues to drop as gas permeates the porous sample and adsorbs to internal sample surfaces. Given the rapid viscous transport rate in the annular region and the slow diffusion rate in the sample 105, the pressure at the pressure measurement device 111 mounted adjacent to the dosing chamber 101 (see FIG. 1) is nearly identical to the pressure at the surface of sample 105. At this point, the system can be modeled as a homogeneous fluid surrounding a porous sample. Within the pore spaces, at medium vacuum, the gas permeability will be dominated by gas-solid collisions and negligible viscous interactions will be present.

In one embodiment, transport of the working gas as a rarefied gas in a pore is modeled using Knudsen diffusion. In principle, Knudsen diffusion is only dependent on the pore size, temperature, and molecular weight. However, this is assuming idealized collisions with the solid surfaces. Deviations from Knudsen diffusion are possible as the gas may interact with the solid surfaces in non-ideal ways. Depending on the strength of the interaction, the gas molecules will be favorably retained on or near the surface as an adsorbed phase. During predominately advective flows, adsorption tends to retard the transport of the adsorbed gas species, but this does not mean the adsorbed phase is totally immobilized. Where diffusion is the predominant transport mechanism, diffusion of the adsorbed phase can be comparable to or larger than Knudsen diffusion in the gas phase, resulting in larger than expected transport rates. Surface diffusion is minimal near 273 K for He and $H_2$ but can be substantial for larger and more polarizable gases, including Ar. Methane transport in shale gas reservoirs is a prime example of a geological system where surface diffusion and adsorption dominate.

For example, when method 200 utilizes helium as the working gas, a comparison of the initial and final pressures of the dosing chamber 101 may be used to estimate the pore volume. From this, the sample porosity and mass density may be calculated. Where more adsorbent gases are utilized, the apparent volume in excess of the helium pore volume may be used to estimate the adsorbed quantity.

In embodiments of the present disclosure, method 200 described herein is scaled to kilogram quantities of geologic material. The sample volumes are similarly larger than known systems, leaving the internal pore and fracture structure of the sample 105 intact. For example, the sample 105 may be provided to the piezometric uptake apparatus 100 with little or no sample preparation.

An advantage of the method 200 according to present disclosure is that all measured quantities are intensive quantities; thus, the method 200 is scalable to even larger systems. However, when comparing geologic core samples to intragranular diffusion in synthetic materials or pure minerals, the geologic sample will additionally contain pores that are substantially larger than in pure mesoporous or microporous media. Transient uptake into microporous media may be in the viscous, slip, or Knudsen regimes, depending upon the relative pore size and mean free path of the gas molecules. As the pressure in the system changes during this method 200, if the pore sizes are comparable to the mean free path of the gas molecules initially, the system may transition through multiple flow regimes during a test and kinetics of the process may be exceedingly complex. From kinetic theory, the mean free path $\lambda_i$ of a pure, ideal pure gas can be estimated from the pressure P, temperature T, the Boltzmann constant $k_B$ and the collision section $\sigma_i$ of gas species i:

$$\lambda_i = \frac{k_B T}{\sqrt{2}\sigma_i P}.$$

The mean free path can then be used to predict the flow regime by the Knudsen Number—the non-dimensional ratio of mean free path to the pore diameter. Systems with a Knudsen number less than 0.01 are effectively in pure viscous continuum flow and the flow in porous media can be described by Darcy's Law. Systems with a Knudsen number greater than 1 are in Knudsen flow and transport becomes independent of gas density, and therefore pressure, as the path length is defined by the pore dimensions alone. Between these regimes, the flow is a mixture of both processes and is known as slip or transition flow. Advective flow in this regime can be modeled using the Klinkenberg correction to Darcy's law, which results in increased gas permeability at lower gas pressures. To avoid a scenario where the flow crosses over multiple flow regimes, the system here will be operated at a medium vacuum; here between 1 and 130 Pa. By reducing the pressure by a factor of $10^3$ to $10^5$ versus atmospheric pressure, the mean free path of the gas increases by a commensurate amount and Knudsen flow occurs in significantly larger pores. The calculated mean free path of He, Ar, and Xe—the three gases of interest—are listed in TABLE 1 under the applicable range of pressures encountered, specifically 293 K at 100 Pa and 1 Pa. As the pressure necessarily decreases during the test, if the pore spaces are initially in Knudsen flow at the start of the test, they will remain so for the duration of the test. That is to say, if the piezometric test here begins near 100 Pa and the pores in the sample are smaller than 204 μm for He and 59 μm for Xe, transport will be limited to Knudsen flow throughout the experiment.

TABLE 1

| Gas species | $\sigma_i/nm^2$ | $\lambda_i$ (100 Pa, 293 K)/μm | $\lambda_i$ (1 Pa, 293 K)/μm |
|---|---|---|---|
| He | 0.140 | 204 | 20,400 |
| Ar | 0.364 | 78.6 | 7860 |
| Xe | 0.485 | 59.0 | 5900 |

In one embodiment of the present disclosure, to avoid the convolution of transport rates in the pores with transport in the system, the sample chamber is oversized relative to ordinary helium porosimetry to provide clearance between the sample 105 and the chamber walls. The inner diameter of the uptake chamber 103 in this embodiment is approximately 1.3 cm (0.51 inch) larger than the sample diameter, leaving an approximately 0.65 cm (0.26 inch) annular void region surrounding sample 105. At 100 Pa, the Knudsen number in this region is approximately 0.031 for He and 0.009 for Xe and changes in pressure in this annular void region will propagate rapidly. Whereas larger annular void spacings lower the Knudsen number even further, an excessively large void volume should be avoided as the gas pycnometer method has greater uncertainty when the sample 105 occupies a small fraction of the volume of the uptake chamber 103.

EXAMPLE

Inventive examples of the method according to the present disclosure were performed utilizing an apparatus having the configuration shown in FIG. 1. The apparatus is predominantly comprised of stainless-steel fittings with ConFlat® flanges. The system was sealed with copper gaskets to minimize permeation of gases both in and out of the system. The upper dosing chamber was a ConFlat® 2.75 four-way cross. This provided adequate dosing chamber volume and ensured an approximately 3.81-cm inner diameter for gas transport. The top port was reduced down to a ½-in Swagelok® VCR fitting to connect to the pressure measuring device. For this experiment, an MKS Baratron® 127A capacitance diaphragm gauge was utilized as the pressure measuring device with a full-scale range of 1 torr [133 Pa]. The reported resolution of the instrument is 0.01% of full scale, in this case 0.013 Pa.

One of the lateral ports is connected to a butterfly valve as the vacuum isolation valve and a dual-stage rotary valve pump as the vacuum source to degas the system. The Viton® gaskets utilized here were lubricated with Dow Corning high vacuum grease to improve the reliability of the butterfly valves. At medium vacuum, the vapor pressure of the vacuum grease does not measurably contribute to the total pressure of the system. The volume downstream of this valve was vented to atmosphere prior to starting the experiment to confirm the butterfly valve sealed adequately and any leakage across this seal would result in air ingress instead of working gas egress.

The lateral port opposite the vacuum pump was connected to a Swagelok® SS-4BK-VCR valve as the dosing isolation valve and is followed by a Valco® VICI EN2SI septum injector nut and SI4G septa as the dosing port. After gases are injected using a Hamilton® 1001 SL gas-tight syringe, the dosing isolation valve is seated to prevent permeation through the septum from effecting the pressure measurements. The dosing isolation valve was installed such that the bellows were located on the septum side and the control volume established by the valve stem was rigid. The lower port of the cross of the dosing chamber is connected to the uptake chamber through a butterfly valve as the sample isolation valve. A butterfly valve is preferably utilized here as the volume of the system must remain constant when it is operated. The volume of the dosing chamber was estimated to be 261.2 mL by weighing the system chamber flooded with water with the pressure transducer removed and adding the reported internal volume of the Baratron® 127A.

The uptake chamber varied with the size of the core to be measured. Two core samples were considered here, a rhyolitic sample from Blue Canyon Dome and a zeolitized non-welded tuff from Aqueduct Mesa. The uptake chamber housing the sample has adequate clearance around the core to ensure viscous flow conditions of the gas throughout the method. As the core samples were substantially different in length and diameter, two uptake chambers were fabricated using either ConFlat® 4.5 or 4.625 flanges and a corresponding zero-length reducer to mate the uptake chamber to the dosing chamber. The measured inner diameter, chamber length, and volume of the uptake chamber—including the zero-length reducer—are tabulated in TABLE 2.

TABLE 2

| | Blue Canyon Dome Core | Chamber 1 | Aqueduct Mesa Core | Chamber 2 |
|---|---|---|---|---|
| Mass/g | 821.4 | N/A | 1359.8 | N/A |
| Length/cm | 18.7 | 21.0 | 29.8 | 30.5 |
| Diameter/cm | 4.73 | 6.03 | 6.06 | 7.44 |
| Volume/mL | 328.6 | 633.7 | 859.5 | 1310.3 |

Each sample was inserted into the uptake chamber and sealed using copper gaskets and ConFlat® flanges prior to a series of tests. Vacuum was drawn on the Blue Canyon Dome sample using an Alcatel® 2020A dual-state rotary vane pump. An Agilent® DS602 dual-stage rotary vane pump replaced this pump for the zeolitized Aqueduct Mesa sample as the Agilent® pump was found to have superior ultimate vacuum pressure: 3.5 Pa versus 7.5 Pa. The rhyolitic sample was heated to 120° C. for 2 h and then allowed to cool to ambient room temperature for at least 6 h. As the zeolitized sample was considered vulnerable to alteration at high temperatures, and the intention is to remove only the weakly bound water that would interfere with total pressure, it was instead heated to 40° C. for 2 h, but similarly allowed to cool to ambient room temperature for at least 6 h.

After outgassing, the vacuum isolation valve was sealed and the bellows to the vacuum pump were vented. The background pressure was recorded for two minutes after shutting the vacuum pump isolation to verify the vacuum isolation valve was seated and free of leakage pathways and to confirm the sample was not exhibiting any virtual leaks. That is, the background pressure should be constant and comparable to the ultimate pressure achievable for a given vacuum pump. The average pressure recorded over this period is taken to be the back-ground pressure $P_b$.

At this point, the dosing chamber was isolated from the uptake chamber. A small quantity of the working gas was then injected using a Hamilton® 1001SL 1-mL gas-tight syringe. Ultra-high purity He and Ar and research purity Xe (all >99.999% molar purity) sourced from Matheson Tri-Gas were utilized here. The injection was terminated when the dosing chamber reached a total pressure of approximately 120 Pa. After completing the injection, the dosing isolation valve was seated and the initial pressure in the dosing chamber was recorded for a minimum of two minutes. Leakage across the sample isolation valve would be detected at this stage by a slow decay in the dosing chamber pressure. Provided a leak was not observed, the average pressure recorded in this period is taken to be the initial pressure $P_i$.

At this point the sample isolation valve is rapidly opened. Measurements were collected for 2 h on the Blue Canyon Dome core and 4 h for the Aqueduct Mesa core at a sampling rate of 100 Hz using a National Instruments USB-6008 for data acquisition from the pressure transducer. The collected data were binned and averaged in one-second intervals, which greatly reduced the electronic noise.

Differences in the transient pressure response were immediately apparent between the two samples and among the individual gases in the zeolitized tuff. In all cases, the prompt expansion occurred as expected, but in the Blue Canyon Dome tuff, all gases converged to a similar fraction of initial pressure. This was not observed in the zeolitized tuff, where significant separation between the gases was rapidly apparent. To scale the results for differences in sample and chamber volume, as well as slight differences in initial and background pressures, the apparent volume of the porous media occupied by gas with time is calculated as the function $\gamma$.

$$Y(t) = \frac{1}{V_s}\left(\left(\frac{P_i - P_b}{P(t) - P_b} - 1\right)V_d - V_u\right)$$

This function is scaled by the volume of the sample such that, at equilibrium, the function approaches the combined porosity $\phi$ and retardation factor $\kappa_i$ of the sample:

$$\lim_{t \to \infty} Y(t) = \phi \kappa_i.$$

Figure 3:
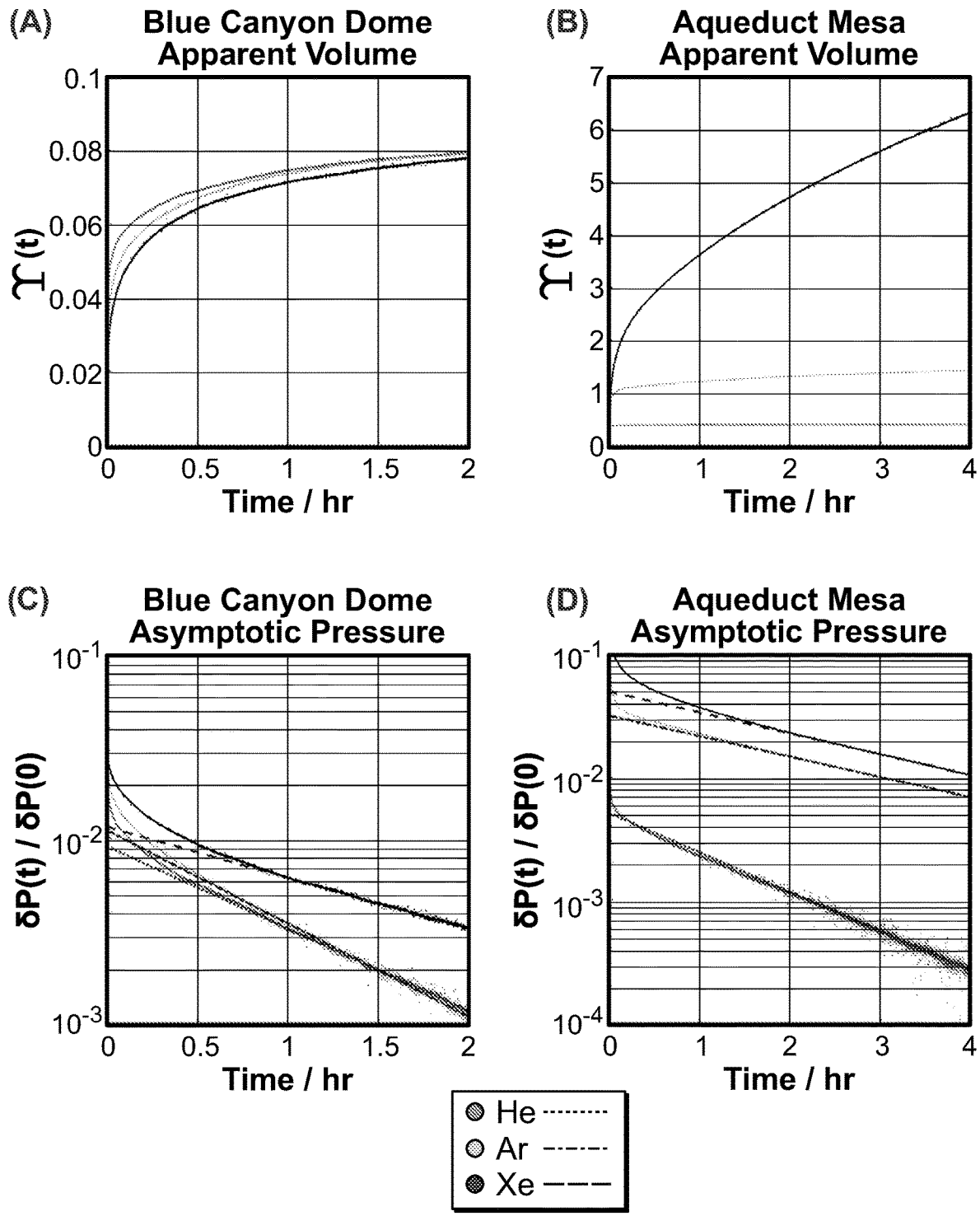
FIG. 3 shows graphs of piezometric uptake data for samples tested according to the method and apparatus of the present disclosure.

FIG. 3 shows graphs of piezometric uptake data for samples tested according to the method and apparatus according to the present disclosure utilizing each of He, Ar and Xe as working gases. Graph (a) of FIG. 3 depicts the piezometric uptake data acquired on the Blue Canyon Dome sample. All three cases approach a porosity-retardation value of approximately 8% after two hours. There is some separation between the gases early in the test, with He transporting more rapidly than Ar or Xe. However, as the separation occurs early in the test, this does not necessarily indicate a difference in diffusivity in the sample as there are substantial differences in the sonic velocity during prompt expansion and the thermal conductivity during temperature recovery. That is, this separation occurs as He has an exceptionally large sonic velocity and thermal conductivity relative to Ar and Xe. Therefore, only the slope of the asymptotic function represents the mass diffusivity.

In contrast to the primary mineral components of the Blue Canyon Dome rhyolitic tuff (quartz, feldspar, biotite, glass, trace minerals, and oxides), zeolites are known to have strong adsorption affinities that are chemically selective. Using the same gases, the results are dramatically different in the zeolitized non-welded tuff, as seen in graph (b) of FIG. 3. Here, the apparent volume of the sample to Ar and Xe far exceeds its bulk geometric volume, as indicated by $\gamma$ exceeding unity. Consequently, condensation of the gas to an adsorbed phase is the dominant accumulation method for Ar and Xe under the experimental conditions.

Using the data displayed in graph (a) and graph (b) of FIG. 3, the asymptotic solution was fit using a least-squares residual method. To demonstrate the quality of the model fits, the perturbed pressure for the estimated equilibrium pressure $P_\infty$ are plotted in graph (c) and graph (d) of FIG. 3. Only the final one hour of data was used in fitting both data sets to minimize the contribution of the higher-order eigenfunctions. However, the asymptotic solution is plotted across the entire range of times to depict the contribution of higher-order eigenfunctions earlier in time.

The projected equilibrium pressure parameter, $P_\infty$, utilized in these regressions is indicated in TABLE 3, as well as the measured averaged background and initial pressure measurements. The projected porosity-retardation factor $\phi \kappa_i$ and the calculated volume ratio $\alpha_i$ for the system at the projected equilibrium is also tabulated in TABLE 3.

TABLE 3

| Sample | Gas | $P_b$/Pa | $P_i$/Pa | $P_\infty$/Pa | $\phi \kappa_i$ | $\frac{\kappa_i}{\kappa_{He}}$ | $\alpha_i$ |
|---|---|---|---|---|---|---|---|
| Blue Canyon Dome | He | 7.75 | 116.1 | 55.43 | 0.0820 | — | 21.01 |
| | Ar | 7.58 | 119.0 | 56.66 | 0.0816 | 0.995 | 21.11 |
| | Xe | 7.63 | 116.5 | 55.46 | 0.0854 | 1.041 | 20.17 |
| Aqueduct Mesa | He | 3.34 | 124.8 | 33.39 | 0.3997 | — | 2.072 |
| | Ar | 3.35 | 112.8 | 17.46 | 1.528 | 3.821 | 0.5421 |
| | Xe | 3.41 | 130.9 | 7.536 | 8.551 | 21.39 | 0.0969 |

As expected from the data in FIG. 3, the projected equilibrium pressure is nearly identical for the three gases in the Blue Canyon Dome sample. Consequently, the porosity-capacity factor $\phi\kappa_i$ and ratio of volumes $\alpha_i$ is nearly identical for the three gases in this system. In contrast, the projected equilibrium pressure for the gases in the zeolitized core was dramatically different, with significantly higher apparent volumes for Xe and Ar over He.

For comparison, mercury intrusion porosimetry (MIP) data were collected on a subsample of these cores by Particle Technology Labs using a Micromeritics Autopore V 9620. These samples were sub-cored directly from the samples analyzed in the piezometric dosing cell. In contrast to the mass of the core samples, the MIP subsamples were relatively small as they are limited by the range of the instrument. The mass of the Blue Canyon Dome sample was 28.2835 g and the mass of the more porous Aqueduct Mesa sample was 3.4580 g. Mercury intrusion indicated a connected porosity of 4.0% for the Blue Canyon Dome subsample and 26.5% for the Aqueduct Mesa subsample.

There is a clear deviation between the porosity derived from the total mercury intrusion volume and the piezometric porosity-retardation factor, with the later reporting a larger than expected porosity. The exact cause of this discrepancy is not clear. It is possible that, given the core sample is much larger, this reflects internal vugs and vesicles that are accessible to the gas after many hours of diffusion, but are either not represented in the subsample or are inaccessible to mercury intrusion. Small errors in the measured volume of the piezometric system or the core sample are also magnified when estimating the porosity. For example, the volume of the core sample was estimated assuming a perfect right cylinder. In addition, as a large span of the pressure transducer range was utilized, any non-linearity in the response would also be detrimental to the results. Regardless of the cause of the deviations between the porosity estimate in the two methods, it is clear that there is negligible separation of the noble gas species in the Blue Canyon Dome core but substantial separation in the Aqueduct Mesa core.

Figure 4:
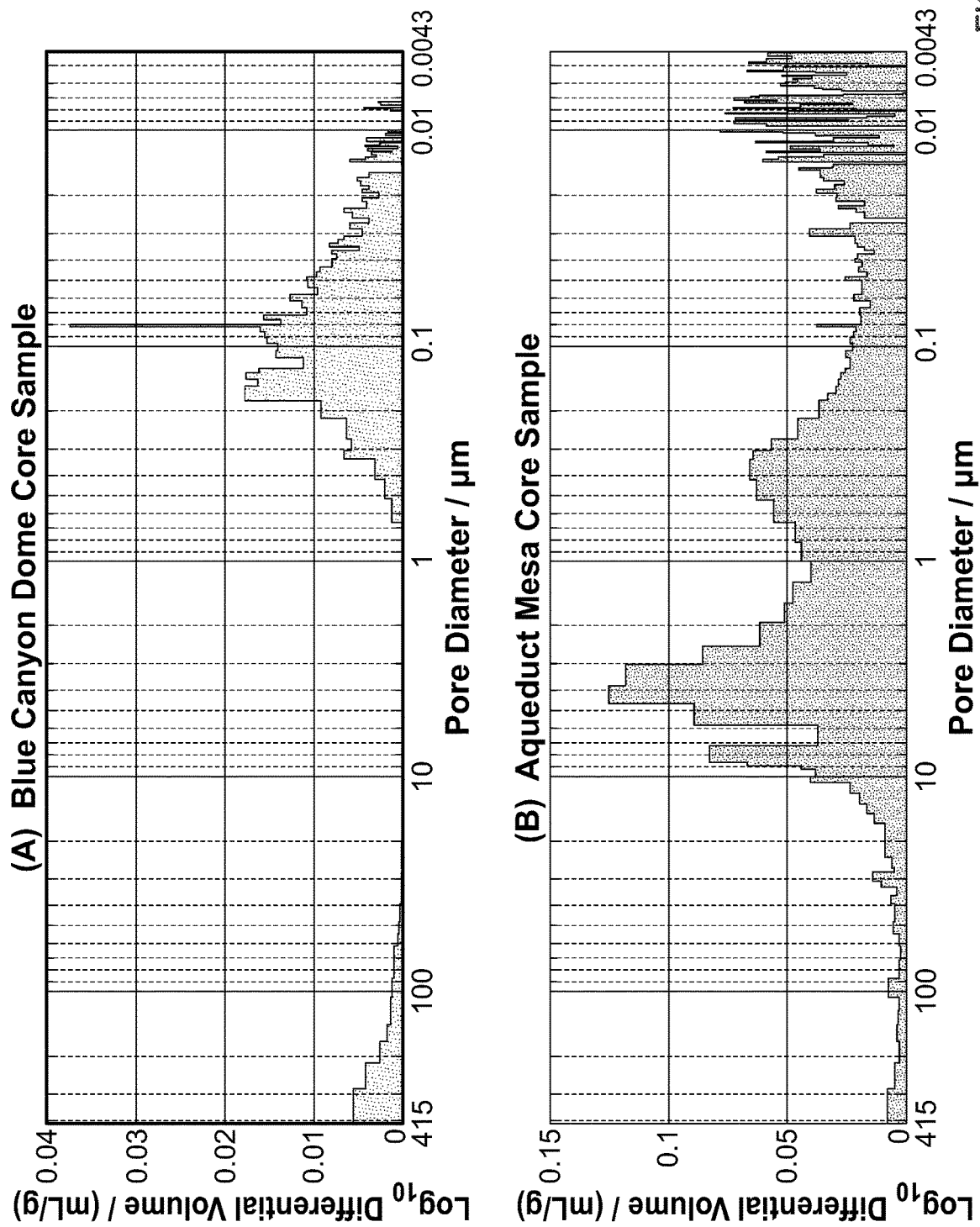
FIG. 4 shows graphs of logarithmic differential volume versus logarithmic pore diameter for samples tested according to the method and apparatus of present disclosure.

The logarithmic differential volume versus logarithmic pore diameter for both core sub-samples are plotted in FIG. 4. The Blue Canyon Dome sample shows a bimodal distribution, with approximately 14% of the pore volume having a diameter greater than 50 µm and the remaining pore volume being centered near 0.1 µm. The smaller pores have a large Knudsen number throughout the experiment, with the larger pores having a Knudsen number closer to unity for Ar and Xe—but closer to two for He. The zeolitized tuff sample also showed a broader pore distribution, with modes centered around 2 µm, 200 nm, and 10 nm. As the tuff contains many different minerals (both original volcanic glass and alteration products like zeolite or clay), this distribution reflects both the pore sizes of the constituent minerals and intergranular spaces. Approximately 90% of the pore volume is smaller than 10 µm and the Knudsen number is consistently large throughout the duration of the experiment.

Using the estimated value of $\alpha_i$, the eigenvalues of the solution series can be found. The first eigenvalue of the transient solution, $k_1$, is listed in TABLE 4. The reciprocal characteristic diffusion time, $\beta_i$, is then found as the quotient of the fitted decay constant, $B_i$, divided by the first eigenvalue. Using the core radius as the characteristic transport length, the estimated effective diffusivity divided by the retardation factor is found. To compare these results against the ideal Knudsen diffusivity model, the ratio of the estimated Ar and Xe diffusivities to He diffusivity, multiplied by the inverse root mass of the species and the reported porosity-retardation factors, is provided in TABLE 3.

TABLE 4

|  | Gas | $B_i \times 10^4$ s | $k_l(\alpha_i)$ | $\beta_i \times 10^5$ s | $\mathcal{D}_i/\kappa_i \times 10^4$ s/cm² | $\frac{\mathcal{D}_i}{\mathcal{D}_{He}}\sqrt{\frac{m_{He}}{m_i}}$ |
|---|---|---|---|---|---|---|
| Blue Canyon Dome | He | 2.85 | 2.44 | 4.77 | 2.67 | — |
|  | Ar | 3.23 | 2.44 | 5.41 | 3.03 | 3.56 |
|  | Xe | 1.76 | 2.45 | 2.94 | 1.65 | 3.68 |
| Aqueduct Mesa | He | 2.05 | 2.73 | 2.76 | 2.53 |  |
|  | Ar | 1.07 | 3.18 | 1.06 | 0.974 | 4.64 |
|  | Xe | 1.09 | 3.67 | 0.812 | 0.746 | 36.07 |

In the Blue Canyon Dome core, the Ar and Xe effective diffusivities are nearly consistent with the inverse square root of molecular weight, with Xe having a slight increase over Ar. However, the diffusivity of He is an outlier, with a much smaller than expected effective diffusivity, relative to Ar and Xe. It is possible that, if the capacity of the core is dominated by vesicles or vugs but transport to these pores passes through a barrier of smaller pores, surface diffusion may have an important effect in permeating these barriers, despite the overall low retardation factor. It may also be possible that lower pressures are necessary and Ar and Xe experienced some viscous flow while He did not, by virtue of its exceptionally small collision cross-section and large mean free path.

In the Aqueduct Mesa core, the effective diffusivity follows a similar but stronger trend. Scaling for molecular weight, Xe exhibits a significantly larger diffusivity than Ar and, again, both Xe and Ar are significantly more diffusive than He. Combined with the large observed retardation factors, this trend is evidence that significant surface diffusion is occurring during the transient.

The surface flow effect here is likely magnified due to adsorption processes. Considering that a significant portion of the Xe and Ar gas is adsorbing, and the most likely adsorption sites are in the nanoporous zeolite minerals, it follows that a significant portion of the gas must also be transporting through these nanopores. In these nanopores, surface diffusion processes are expected to be more dominant in the smaller pores given the larger surface area to volume ratio. At the same time, as the He gas negligibly adsorbs, the nano-pores contribute relatively little to the apparent volume of the sample. Consequently, a smaller fraction of He is transported in the nanopores and the He diffusivity is more heavily weighted by diffusion in the intergranular spaces.

A great disparity has been shown in the adsorption capacity for zeolitized tuff and non-zeolitized rhyolitic volcanics, as indicated by the projected porosity-retardation factors. The presence of zeolites and other microporous minerals lead to retardation factors of approximately 3.82 for Ar and 21.4 for Xe, assuming the He retardation is negligible. Utilization of the specific adsorption capacity for the various working gases may also be utilized to identify geologic samples. For example, particular samples having zeolites may be identified by the specific retardation factors for the specific working gases.

Additionally, the piezometric uptake rate measurements indicate the gas permeability under medium vacuum conditions was not adequately explained by Knudsen diffusion alone in the nanoporous material. That is, the permeabilities did not follow the inverse square-root relationship with molecular weight as predicted by Knudsen flow. Despite both core samples being highly heterogeneous, with a broad range of pore distributions, the asymptotic method provided a good qualitative fit to the acquired pressure data and provided a rapid means to evaluate the importance of surface interactions in gas uptake rates.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rarefied piezometric uptake apparatus comprising:
   a dosing chamber in selective fluid communication with an uptake chamber, the uptake chamber having a geometry that permits insertion of a solid sample with spacing between the solid sample and at least one wall of the uptake chamber;
   a vacuum source arranged and disposed to draw a medium vacuum on the dosing chamber and uptake chamber sufficient to induce rarefied flow in the sample pores; and
   a pressure measurement device arranged and disposed to measure a pressure in the dosing chamber.

2. The apparatus of claim 1, wherein the spacing between the solid sample and the at least wall is sufficient to permit viscous flow of gas around a surface of the sample but limit the flow of gases in sample pores to rarefied molecular diffusion.

3. The apparatus of claim 1, wherein the sample is provided is a solid form.

4. The apparatus of claim 3, wherein the sample is provided is a geologic core sample.

5. The apparatus of claim 1, wherein the spacing is between ¼ inch (0.64 cm) and ½ inch (1.27 cm).

6. The apparatus of claim 1, wherein the dosing chamber further includes a heater arranged and disposed to heat the sample.

7. The apparatus of claim 1, wherein the selective fluid communication is provided by a sample isolation valve.

8. The apparatus of claim 7, wherein the sample isolation valve is selected from the group consisting of a butterfly valve.

9. The apparatus of claim 1, wherein the pressure measurement device is a capacitance manometer.

10. The apparatus of claim 1, wherein the medium vacuum is a pressure from 1 Pa to 130 Pa.

11. A method for measuring gaseous uptake for a solid sample, the method comprising:
    providing a rarefied piezometric uptake apparatus having a dosing chamber and uptake chamber in selective fluid communication;
    positioning the solid sample in the uptake chamber;
    outgassing the dosing chamber and uptake chamber to a medium vacuum;
    isolating the uptake chamber from the dosing chamber;
    injecting a predetermined amount of a working gas into the dosing chamber;
    releasing the working gas from the dosing chamber into the uptake chamber;
    and measuring a pressure in the uptake apparatus with a pressure measurement device to determine an uptake property of the solid sample.

12. The method of claim 11, wherein the sample is provided is a solid form.

13. The method of claim 12, wherein the sample is provided is a geologic core sample.

14. The method of claim 11, wherein the uptake property is a porosity of the solid sample.

15. The method of claim 11, wherein the uptake property is gas adsorption.

16. The method of claim 11, wherein the method is repeated with a reference gas as the working gas.

17. The method of claim 11, wherein the working gas is a noble gas.

18. The method of claim 11, wherein the working gas is selected from helium, argon, xenon and combinations thereof.

19. The method of claim 11, wherein the medium vacuum is a pressure from 1 Pa to 130 Pa.

20. The method of claim 11, further comprising a pressure rise test after the outgassing to measure pressure to identify potential leaks in the apparatus.

* * * * *